United States Patent
Myrah et al.

(10) Patent No.: US 9,832,088 B2
(45) Date of Patent: Nov. 28, 2017

(54) MONITORING OF SHARED SERVER SET POWER SUPPLY UNITS

(71) Applicant: Microsoft Technology Licensing, LLC, Redmond, WA (US)

(72) Inventors: Michael Myrah, Sammamish, WA (US); Matthew Jeremiah Eason, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 14/502,758

(22) Filed: Sep. 30, 2014

(65) Prior Publication Data

US 2016/0094426 A1  Mar. 31, 2016

(51) Int. Cl.
*G06F 1/32* (2006.01)
*H04L 12/26* (2006.01)
*H04L 29/08* (2006.01)
*G06F 1/26* (2006.01)
*G06F 1/28* (2006.01)

(52) U.S. Cl.
CPC ............... *H04L 43/08* (2013.01); *G06F 1/26* (2013.01); *G06F 1/28* (2013.01); *G06F 1/3206* (2013.01); *G06F 1/3234* (2013.01); *H04L 67/10* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 5,481,730 A | * | 1/1996 | Brown | ...................... G06F 1/26 307/52 |
| 7,493,503 B2 | | 2/2009 | Aldereguia et al. | |
| 8,103,907 B2 | | 1/2012 | Janick et al. | |
| 8,522,077 B2 | | 8/2013 | Horvath et al. | |
| 2003/0065958 A1 | | 4/2003 | Hansen et al. | |
| 2008/0320322 A1 | | 12/2008 | Green et al. | |
| 2010/0280774 A1 | * | 11/2010 | Ewing | ...................... H04Q 9/00 702/60 |
| 2010/0318826 A1 | | 12/2010 | Hansen et al. | |

(Continued)

OTHER PUBLICATIONS

"International Search Report & Written Opinion Received for PCT Application No. PCT/US2015/052537", dated Nov. 16, 2015, 11 Pages.

(Continued)

*Primary Examiner* — Zahid Choudhury
(74) *Attorney, Agent, or Firm* — Workman Nydegger

(57) ABSTRACT

Power monitoring in a server set that has a shared power supply system that includes multiple power supply unit sets that each provide power to the server set. A controller monitors power usage of the server set, and evaluates the monitored power usage against the power supply capability of each of the power supply unit sets. Based on the evaluation, the controller can detect when a particular power supply unit set is no longer capable of solely providing all of the power that the server set is consuming or anticipated to consume, and then reduce power accordingly so that the particular power supply unit set could provide such power.

20 Claims, 4 Drawing Sheets

(56) References Cited

U.S. PATENT DOCUMENTS

| | | | |
|---|---|---|---|
| 2010/0327656 A1* | 12/2010 | Humphrey | H02J 1/10 |
| | | | 307/43 |
| 2013/0073882 A1* | 3/2013 | Inbaraj | G06F 1/3206 |
| | | | 713/320 |
| 2013/0080793 A1 | 3/2013 | Familiant et al. | |
| 2013/0179718 A1* | 7/2013 | Jau | G06F 1/263 |
| | | | 713/340 |
| 2013/0268779 A1 | 10/2013 | Hueston et al. | |
| 2015/0123473 A1* | 5/2015 | Braylovskiy | H02J 9/061 |
| | | | 307/23 |
| 2015/0370301 A1* | 12/2015 | Bolan | G06F 1/263 |
| | | | 713/322 |

OTHER PUBLICATIONS

"International Preliminary Report on Patentability Issued in PCT Application No. PCT/US2015/052537", dated Dec. 20, 2016, 8 Pages.

"Second Written Opinion Issued in PCT Application No. PCT/US2015/052537", dated Aug. 12, 2016, 7 Pages.

"HP Power Capping and HP Dynamic Power Capping for ProLiant servers", Published on: Jan. 23, 2014, Available at: http://h20565.www2.hp.com/portal/site/hpsc/template.BINARYPORTLET/public/kb/docDisplay/resource.process/?spf_p.tpst=kbDocDisplay_ws_Bl&spf_p.rid_kbDocDisplay=docDisplayResURL&javax.portlet.begCacheTok=com.vignette.cachetoken&spf_p.rst_kbDocDisplay=wsrp-resourceState%3DdocId%253Demr_na-c01549455-5%.

"Cisco Unified Computing System Blade Server Chassis Power Modes", In White Papers of Cisco, Oct. 2010, 8 pages.

\* cited by examiner

MONITORING OF SHARED SERVER SET POWER SUPPLY UNITS

BACKGROUND

A wide variety of services are offered over networks. For instance, cloud computing is based entirely on the concept of providing services over a network, and often from a remote location. The term "cloud" is used to symbolize that wherever the end user is, whatever device they have, they can acquire services over a network. To the user, the goal is to make it appear that the services comes from the very clouds, being ever present.

Of course, while those services may have the appearance of being provided from a "cloud" from the end-user perspective, there is actually physical hardware that is used to provide the services. The modifier "cloud" in the term "cloud computing" implies high availability of services. In an abstract user experience sense, it is as though the user may simply reach up into the ever present cloud to extract the desired service. Accordingly, cloud services are expected to have high levels of availability. Entire datacenters filled with thousands of servers may provide the physical infrastructure for the cloud services provided over the network. To provide high availability expected of cloud services, it is thus important that the servers not be disrupted in their work to provide service to an end-user.

In order to ensure that power is reliably supplied to a given server set, often redundant server set power feeds are provided to the server set. For instance, a datacenter might receive redundant datacenter alternating current (AC) power feeds specifically so that redundant server set power feeds may be provided to a server set. Within the server set, one of the server set power feeds would provide power to one set of power supply units, while the other server set power feed would provide power to another set of power supply units. Accordingly, if one of the server set power feeds goes down, the other server set power feed may continue to supply power, thereby improving availability of the server set.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to power monitoring in a server set that has a shared power supply system that provides power to the one or more servers in the server set. The datacenter in which the server set is hosted receives redundant datacenter alternating current (AC) power feeds that each map to a corresponding server set power feed. Each server set power feed provides power to a corresponding power supply unit set that serves the server set.

In accordance with some embodiments described herein, a controller monitors power usage of the server set, and evaluates the monitored power usage against the power supply capability of the aggregated power supply unit feeds. Based on the evaluation, the controller can detect when a particular power supply unit set is no longer capable of solely providing all of the power that the server set is consuming or anticipated to consume.

In accordance with other embodiments described herein, a controller detects when a particular power supply unit set is no longer capable of solely providing all of the power that the server set is consuming or anticipated to consume. The controller also identifies one or more actions that would lower power consumption of the server set such that if all of the plurality of server set power feeds were to be lost except for the particular server set power feed, the power consumption of the server set could be met by the particular server set power feed. Furthermore, in response to detecting that the particular server set power feed is no longer capable of solely providing power to the server set, the controller performs the identified one or more actions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to power monitoring in a server set that has a shared power supply system that provides power to the one or more servers in the server set. The datacenter in which the server set is hosted receives redundant datacenter alternating current (AC) power feeds that each map to corresponding server set power feed. Each server set power feed provides power to corresponding set of power supply units that serves the server set.

In accordance with some embodiments described herein, a controller monitors power usage of the server set, and evaluates the monitored power usage against the power supply capability of the aggregate power supply unit feeds. Based on the evaluation, the controller can detect when a particular power supply unit set (which is mapped to one of the datacenter feeds) is no longer capable of solely providing all of the power that the server set is consuming or anticipated to consume.

In accordance with other embodiments described herein, a controller detects when a particular power supply unit set is no longer capable of solely providing all of the power that the server set is consuming or anticipated to consume. The controller also identifies one or more actions that would lower power consumption of the server set such that if all of the plurality of server set power feeds were to be lost except for the particular server set power feed, the power consumption of the server set could be met by the particular power supply feed. Furthermore, in response to detecting that the particular server set power feed is no longer capable of solely providing power to the server set, the controller performs the identified one or more actions.

Figure 1:
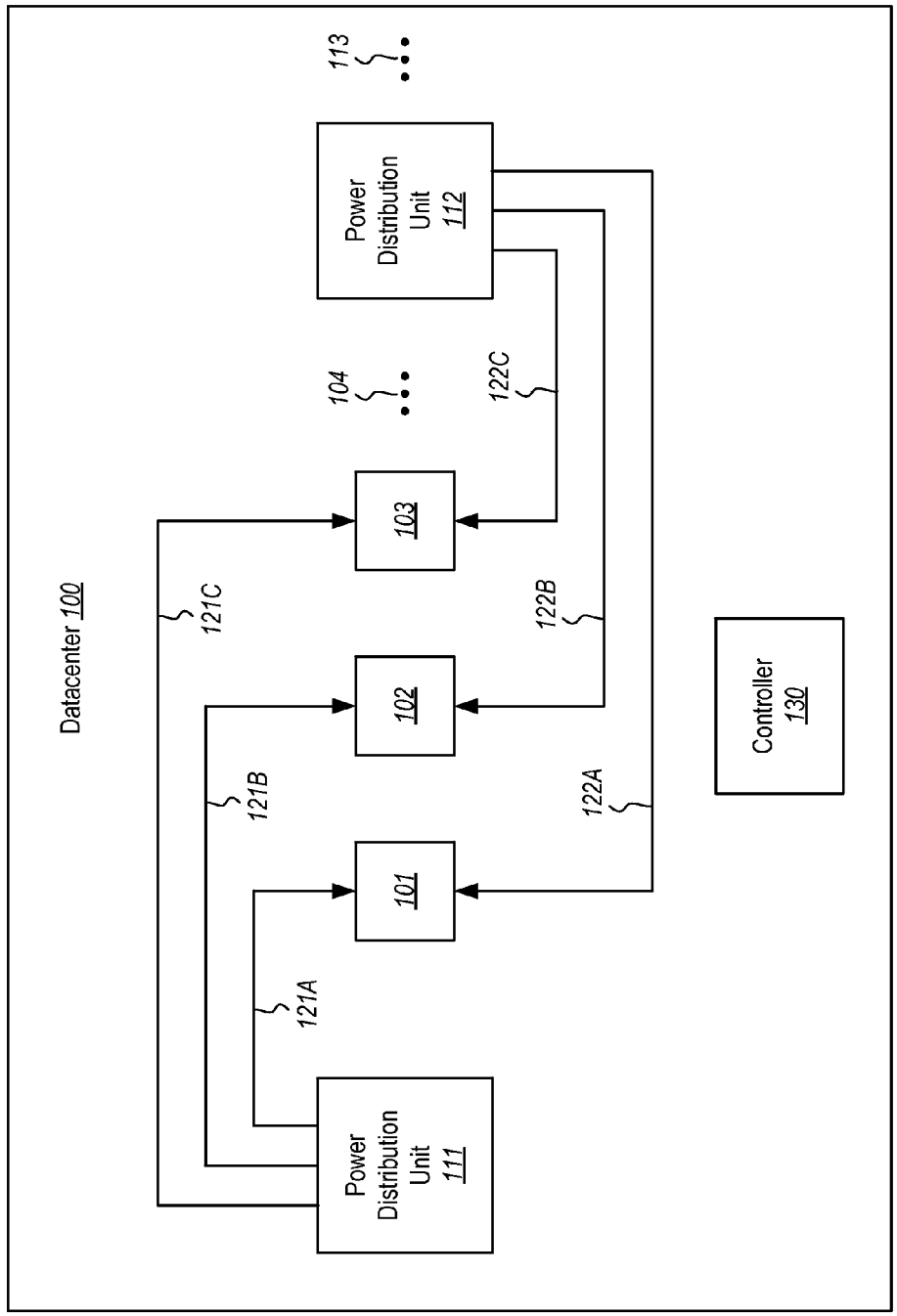
FIG. 1 illustrates a datacenter in which the principles described herein may be employed, and which includes multiple server sets.

FIG. 1 illustrates a datacenter 100 in which the principles described herein may be employed. The datacenter 100 includes multiple server sets 101, 102 and 103. The server sets may each include any number of servers. For instance, if the server set was a server rack, there may be a large number of servers within a given server set. On a lesser scale, the server sets may be a server chassis that contains multiple servers. In that case, the servers might take the form of server blades although not required. The server sets might be even in a higher scale than a server rack such as, for example, an entire server container constituting multiple server racks. In any case, regardless of scale, each server set 101, 102 and 103 constitute a set of one or more servers.

Although only three server sets 101, 102 and 103 are illustrated in FIG. 1, this is merely for purposes of simplicity and clarity. The ellipses 104 represent that there may be any number of server sets within the datacenter 100. For instance, datacenters may have thousands or even millions of servers therein. Accordingly, FIG. 1 should be viewed only as a simple example and abstract representation of a datacenter 100.

The datacenter 100 is illustrated as including power distribution unit 111 and power distribution unit 112. The power distribution units 111 and 112 might be any means for acquiring electrical power such as, for example, external utility companies, on-site generated power (such as an electrical generator, solar panels, and/or fuel cells), uninterruptable power supply (UPS), and/or batteries, or any other mechanism to access electrical power. The ellipses 113 represents that there may potentially be more than two power distribution units within the datacenter.

Each power distribution unit 111 provides a power supply unit feed to each of the server sets 101, 102 and 103. For instance, power distribution unit 111 provides power supply unit feeds 121A, 121B and 121C to server sets 101, 102 and 103, respectively. Likewise, power distribution unit 112 provides power supply unit feeds 122A, 122B and 122C to server sets 101, 102 and 103, respectively. As an example, the power supply unit feeds 121A and 122A may be or may be used to provide a corresponding server set power feed to the server set 101. The power supply unit feeds 121B and 122B may be or may be used to provide a corresponding server set power feed to the server set 102. Also, the power supply unit feeds 121C and 122C may be or may be used to provide a corresponding server set power feed to the server set 103. If there are additional power distribution units (as symbolized by the ellipses 113), then those one or more additional power distribution units might likewise provide power supply unit feeds to the server sets, to provide even further power redundancy.

Accordingly, the datacenter 100 has a shared power supply (represented by power distribution unit 111, 112 and potentially 113) that allows the datacenter 100 to provide redundant server set power feeds to each of the server sets. This provides redundancy in case of a failure of one of the server set power feeds, thereby improving reliability of the datacenter 100.

Figure 2:
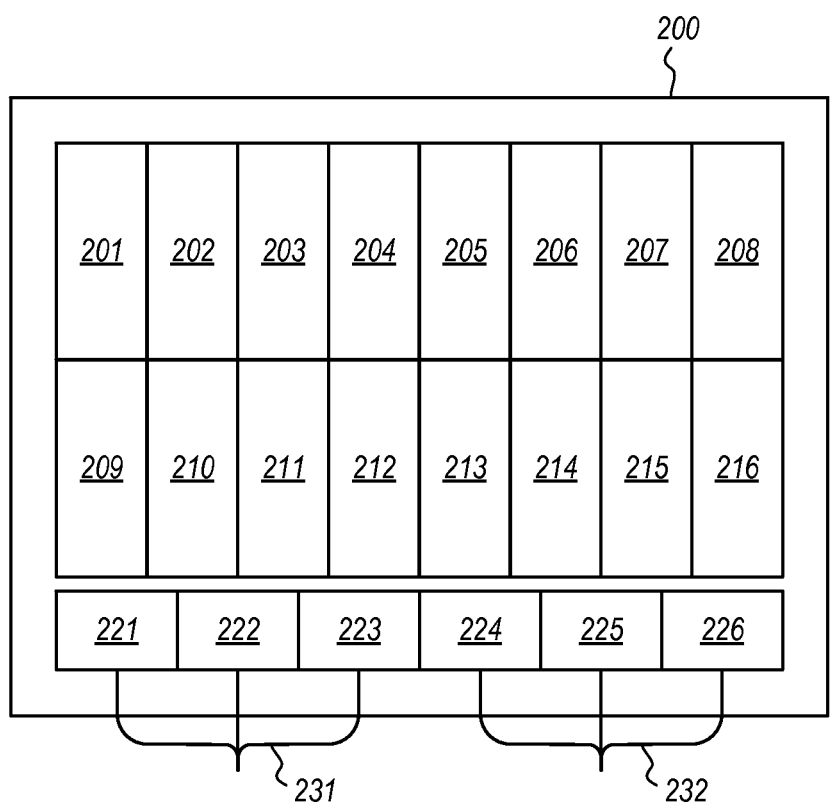
FIG. 2 illustrates an example of a server set enclosure that is an example of any of the server sets of FIG. 1.

FIG. 2 illustrates an example of a server set enclosure 200 that is an example of any of the server sets 101, 102 or 103 of FIG. 1. In this example, the server set enclosure encloses 16 servers 201 through 216. In this specific example, each server 201 through 216 is a blade such that the server set enclosure 200 is a blade enclosure. The server set enclosure 200 has six power supply units 221 through 226. A server set power feed 231 is illustrated as providing power to a first power supply unit set constituting three of the power supply units 221 through 223, and the server set power feed 232 is illustrated as providing power to a second power supply unit set constituting power supply units 224 through 226. The power supply units 221 through 226 condition the power for consumption by the servers 201 through 216. Each of the servers may operate as described below for the computing system 400 of FIG. 4. The power supply units 221 through 226 each contribute to the aggregated power needs of the servers 210 through 216.

If the server set enclosure 200 were the server set 101 of FIG. 1, then the server set power feed 231 of FIG. 2 may be, or be derived from, the power supply unit feed 121A of FIG. 1, and the server set power feed 232 of FIG. 2 may be, or may be derived from, the power supply unit feed 122A of FIG. 1. If the server set enclosure 200 were the server set 102 of FIG. 1, then the server set power feed 231 of FIG. 2 may be, or be derived from, the power supply unit feed 121B of FIG. 1, and the server set power feed 232 of FIG. 2 may be, or may be derived from, the power supply unit feed 122B of FIG. 1. If the server set enclosure 200 were the server set 103 of FIG. 1, then the server set power feed 231 of FIG. 2 may be, or may be derived from, the power supply unit feed 121C of FIG. 1, and the server set power feed 232 of FIG. 2 may be, or may be derived from, the power supply unit feed 122C of FIG. 1.

In order to provide redundant power supply, the following redundancy conditions should be provided: 1) the server set power feed 231 (e.g., more directly speaking, the first power supply unit set 221 through 223) should provide sufficient power to carry on operations of the servers 201 through 216, regardless of whether the server set power feed 232 (e.g., more directly speaking, the second power supply unit set 224 through 226) loses power, and 2) the server set power feed 232 (e.g., more directly speaking, the second power supply unit set 224 through 226) should provide sufficient power to carry on operations of the servers 301 through 316, regardless of whether the server set power feed 231 (e.g., more directly speaking, the first power supply unit set 221 through 223) loses power.

Figure 3:
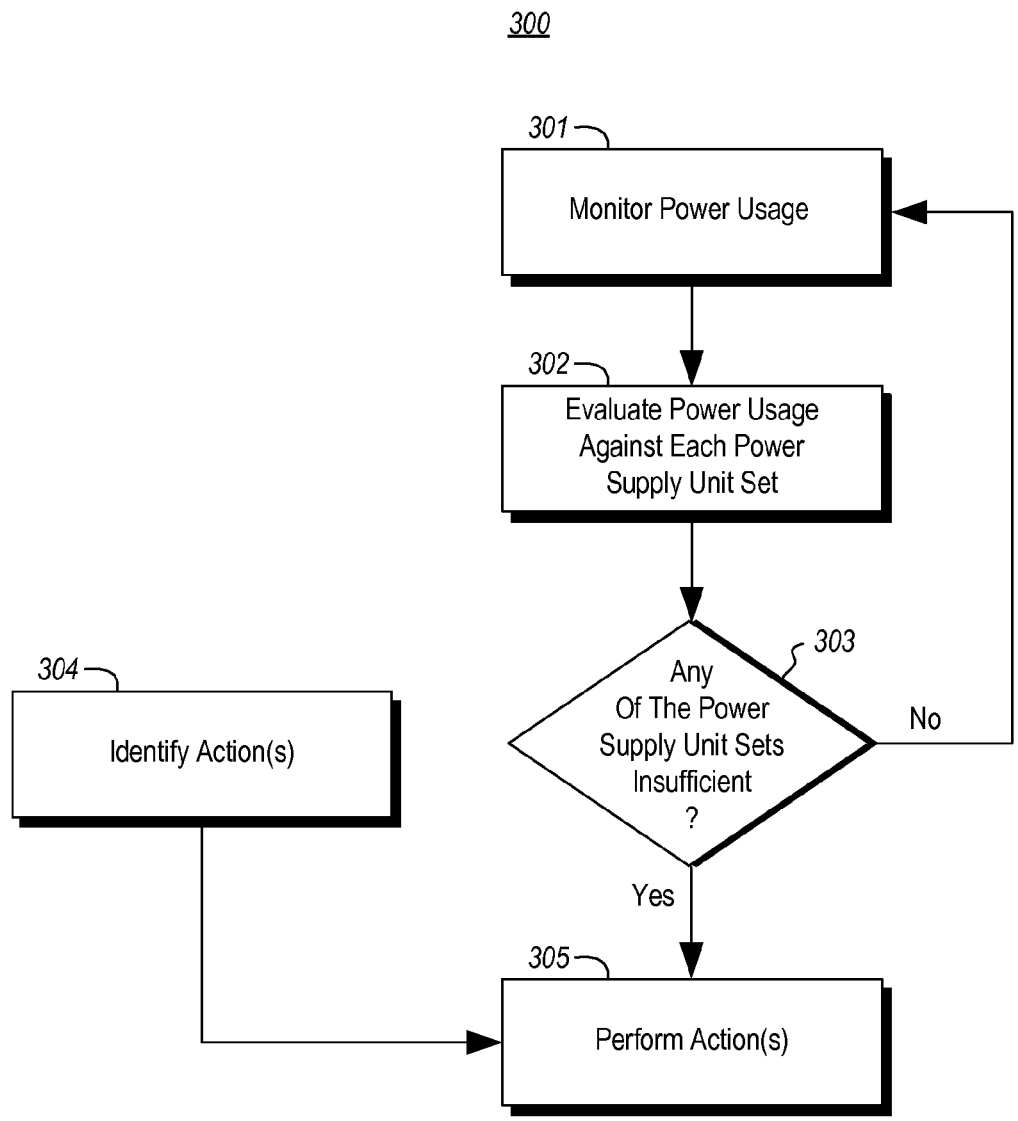
FIG. 3 illustrates a flowchart of a method for improving reliability of a server set of one or more servers.

FIG. 3 illustrates a flowchart of a method 300 for improving reliability of a server set of one or more servers. Referring to FIG. 1, the method 300 might be performed by a power supply controller 130. For instance, the power supply controller 130 might perform the method 300 in response to executing computer-executable instructions that are structured such that, when executed by the controller, cause the controller to perform the method 300. The power supply controller 130 might be implemented on a server within the server set, or might be implemented outside of the server set. There might be a power supply controller 130 dedicated for each server set, but a single controller 130 might likewise perform the method 300 for multiple server sets, or even perhaps for all of the server sets in the entire datacenter 100.

For a given server set, the power supply controller monitors (act 301) power usage of a server set. For instance, in the context of the server set of FIG. 2, the power supply controller might monitor aggregated power usage of the servers 201 through 216. For instance, the power supply controller might keep track of historical power usage to verify any trends in the power usage, such as increasing, stable, or decreasing.

The power supply controller evaluates (act 302) the monitored power usage of the server set against the power supply capability of each of the power supply unit sets. If the evaluation does not result in a detection that any of the power supply unit sets would no longer be capable of solely providing all of the power that the server set is consuming or anticipated to consume ("No" in decision block 303), then the monitoring (act 301) and evaluation (act 302) are repeated. This monitoring (act 301) and evaluation (act 302) may be periodically performed or even continuously performed.

At some point, the power supply controller may detect that a particular power supply unit set is no longer capable of solely providing all of the power that the server set is consuming or is anticipated to consume ("Yes" in decision block 303). With respect to FIG. 2, the power supply controller might detect that the first power supply unit set 221, 222 and 223 powered by server set power feed 231 would be insufficient to provide all of the power that the servers 201 through 216 are consuming or are anticipated to consume should the server set power feed 232 lose power. Alternatively or in addition, the power supply controller might detect that the second power supply unit set 224, 224 and 226 powered by server set power supply feed 232 would be insufficient to provide all of the power that the servers 201 through 216 are consuming or are anticipated to consume should the server set power feed 232 lose power.

Applying this principle to FIG. 1, the power supply controller 130 might detect that the server set power feed 121A (via the corresponding power supply unit set) would be insufficient to provide all of the power that the server set 101 is consuming or is anticipated to consume should the server set power feed 122A lose power. Alternatively or in addition, the power supply controller 130 might detect that the server set power feed 122A (via the corresponding power supply unit set) would be insufficient to provide all of the power that the server set 101 is consuming or is anticipated to consume should the server set power feed 121A lose power. Similarly, the power supply controller 130 might detect if the server set power feed 121B (via the corresponding power supply unit set) becomes insufficient to solely power the server set 102 in case of loss of server set power feed 122B, or that the server set power feed 122B (via the corresponding power supply unit set) becomes insufficient to solely power the server set 102 in case of loss of power supply feed 122A. Also with respect to FIG. 1, the power supply controller 130 might detect if the server set power feed 121C (via the corresponding power supply unit set) becomes insufficient to solely power the server set 103 in case of loss of server set power feed 122C, or that the server set power feed 122C (via the corresponding power supply unit set) becomes insufficient to solely power the server set 103 in case of loss of the server set power feed 121C.

In one embodiment, the lack of anticipated capability of the particular power supply unit set is due to a lost capability of at least one power supply unit that receives power from a particular server set power feed. For instance, in FIG. 2, suppose that power supply unit 223 loses functionality and is no longer able to provide power from the server set power feed 231 to any of the servers 201 through 216. That loss in a single power supply unit 223 may be enough such that the power supply set 221-223 is no longer capable of sufficiently powering the servers 201 through 216 in case of a loss in the server set power feed 232. An alternative cause might simply be that the power supply units lose efficiency over time due to aging. Alternatively or in addition, a power supply unit might have come from a bad lot and is flagged for closer monitoring by the power supply controller 130. For instance, the power supply controller 130 might have access to specific serial numbers that corresponding to known bad lots, or the power supply unit might otherwise be flagged so that the power supply controller 130 might expect the power supply unit to fail soon.

In other case, the anticipated lack of capability of the particular power supply unit set is due to consumption activity of the server set increasing beyond a predetermined level of consumption. For instance, even in the absence of a failure of any of the power supply units for a particular power supply unit set, perhaps the usage of the server set has increased to the point where there is a danger that the power supply unit set will soon not be able to power the server set given the increasing trend of power usage of that server set.

The power supply controller identifies (act 304) one or more actions that would lower power consumption of the server set such that if all of the power supply unit sets were to be lost except for the particular power supply unit set, the power consumption of the server set could be met by the particular power supply unit set. In other words, an action plan may be formulated to reduce power usage to again return to a state where complete redundancy is provided. This act 304 is shown in parallel with acts 301, 302 and 303, to illustrate that there is no temporal dependency between when these actions are identified and the monitoring and evaluation operations of acts 301 and 302.

Once one of the power supply unit sets is detected as insufficient ("Yes" in decision block 303), and appropriate actions to reduce power consumption are identified (act 304), the identified one or more actions are performed (act 305). For instance, as examples only, the actions that reduce power consumption might be to migrate at least one, some, or perhaps even all, workload from the server set. Other types of actions include reducing fan speed, processor utilization, disk drive spin speed or disk drive power consumption; or increasing slightly the accepted operational temperature.

Accordingly, the principles described herein allow a server set to retain complete redundancy in power supply unit sets in the presence of real world conditions. For instance, if a given power supply unit set is anticipated to no longer be able to provide all of the power needs of a server set (due to lost capability of conveying power to the server set, and/or due to increased power usage in the server set) actions can be quickly taken to reduce power usage of the server set. Accordingly, power supply feed redundancy is retained, and quality of service is maintained.

Although not required, many of the components and operations described herein may be performed by a computing system. For instance, each of the servers 201 through 216 might represent a computing system. Furthermore, the operation of the power supply controller 130 might be accomplished via the use of a computing system. Accordingly, a computing system will now be described with respect to FIG. 4.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 4:
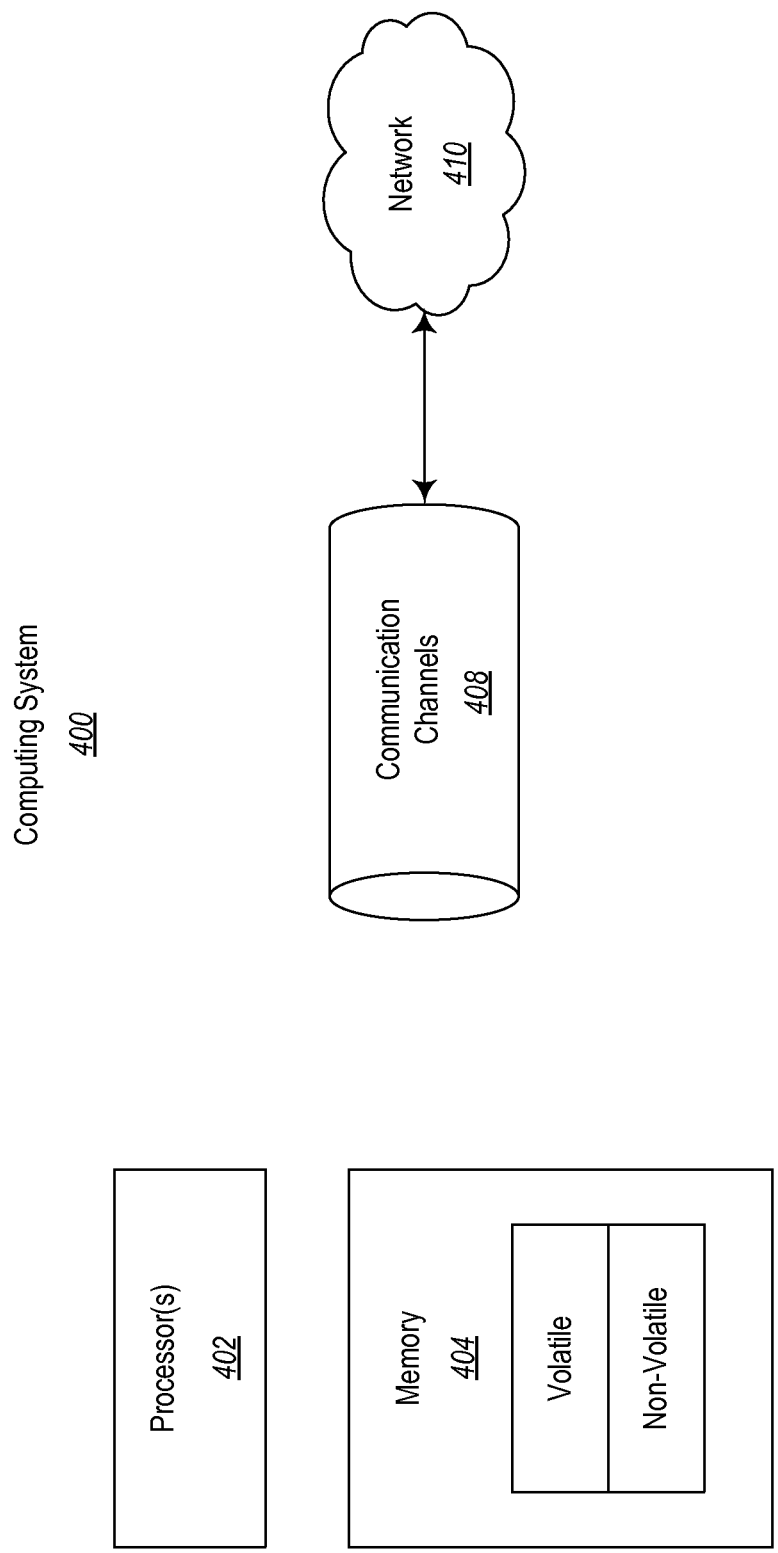
FIG. 4 illustrates an example computing system in which the principles described herein may be employed.

As illustrated in FIG. 4, in its most basic configuration, a computing system 400 typically includes at least one processing unit 402 and memory 404. The memory 404 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 404 of the computing system 400. Computing system 400 may also contain communication channels 408 that allow the computing system 400 to communicate with other message processors over, for example, network 410.

Embodiments described herein may comprise or utilize a special-purpose or general-purpose computer system that includes computer hardware, such as, for example, one or more processors and system memory, as discussed in greater detail below. The system memory may be included within the overall memory 404. The system memory may also be referred to as "main memory", and includes memory locations that are addressable by the at least one processing unit 402 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for retaining redundancy in power supply unit sets of a shared power supply system, the method comprising:

identifying a plurality of power supply unit sets of a shared power supply system that each include a single power feed and a single output, including at least a first power supply unit set that is supplied by a first power feed and supplies a single output corresponding to the first power supply unit set, the first power supply unit set comprising a first plurality of power supply units giving the single output corresponding to the first power supply unit set a first capacity, and a second power supply unit set that is supplied by a second power feed and supplies a single output corresponding to the second power supply unit set, the second power supply unit set comprising a second plurality of power supply units giving the single output corresponding to the second power supply unit set a second capacity, each of the first capacity associated with the first power supply unit set and the second capacity associated with the second power supply unit set being sufficient to solely provide all of the power that a server set consumes or is anticipated to consume;

detecting that a change in the first capacity has occurred with respect to the single output corresponding to the first power supply unit set, including detecting a loss of functionality of at least one of the first plurality of power supply units, such that the single output corresponding to the first power supply unit set now has a new third capacity that is lower than the second capacity of the single output corresponding to the second power supply unit set and which is no longer capable of solely providing all of the power that the server set consumes or is anticipated to consume;

based at least on detecting that the change in the first capacity has occurred with respect to the single output corresponding to the first power supply unit set, identifying one or more actions to perform on the server set that would lower power consumption of the server set to within the new third capacity of the single output corresponding to the first power supply unit set so that the new third capacity of the single output corresponding to the first power supply unit set would be able to solely provide all of the power that the server set consumes or is anticipated to consume if all of the plurality of power supply unit sets except the first power supply unit set were to be lost, such that redundancy in the shared power supply system is retained; and automatically performing the identified one or more actions to lower power consumption of the server set.

2. The method in accordance with claim 1, the identified one or more actions comprising:
migrating a workload from the server set.

3. The method in accordance with claim 1, the identified one or more actions comprising:
migrating all workloads from the server set.

4. The method in accordance with claim 1, the identified one or more actions comprising:
reducing a fan speed.

5. The method in accordance with claim 1, the identified one or more actions comprising:
reducing a processor utilization.

6. The method in accordance with claim 1, the identified one or more actions comprising:
reducing power consumption of a hard drive.

7. A system comprising:
a server set comprising one or more servers;
a shared power supply system that comprises a plurality of power supply unit sets that each include a single power feed and a single output, including at least a first power supply unit set and a second power supply unit set, that are each configured to provide power to the server set and that are each configured to solely provide all of the power that the server set consumes or is anticipated to consume, the first power supply unit set being supplied by a first power feed and including a single output corresponding to the first power supply unit set that is configured to supply the server set, the first power supply unit set comprising a first plurality of power supply units giving the single output corresponding to the first power supply unit set a first capacity, and the second power supply unit set being supplied by a second power feed and including a single output corresponding to the second power supply unit set that is configured to supply the server set, the second power supply unit set comprising a second plurality of power supply units giving the single output corresponding to the second power supply unit set a second capacity; and a power supply controller that is configured to perform the following:

detect that a change in the first capacity has occurred with respect to the single output corresponding to the first power supply unit set, including detecting a loss of functionality of a least one of the first plurality of power supply units, such that the single output corresponding to the first power supply unit set now has a new third capacity that is lower than the second capacity of the single output corresponding to the second power supply unit set and which is no longer capable of solely providing all of the power that the server set consumes or is anticipated to consume;

based at least on detecting that the change in the first capacity has occurred with respect to the single output corresponding to the first power supply unit set, identify one or more actions to perform on the server set that would lower power consumption of the server set to within the new third capacity of the single output corresponding to the first power supply unit set so that the new third capacity of the single output corresponding to the first power supply unit set would be able to solely provide all of the power that the server set consumes or is anticipated to consume if all of the plurality of power supply unit sets except the first power supply unit set were to be lost, such that redundancy in the shared power supply system is retained; and perform the identified one or more actions to lower power consumption of the server set.

8. The system in accordance with claim 7, the server set being a server chassis.

9. The system in accordance with claim 7, the plurality of power supply unit sets including only the first power supply unit set and the second power supply unit set.

10. The system in accordance with claim 7, the server set comprising a plurality of servers.

11. The system in accordance with claim 7, the identified one or more actions comprising migrating a workload from the server set.

12. The system in accordance with claim 7, the identified one or more actions comprising migrating all workloads from the server set.

13. The system in accordance with claim 7, the identified one or more actions comprising reducing a fan speed.

14. The system in accordance with claim 7, the identified one or more actions comprising reducing a processor utilization.

15. The system in accordance with claim 7, the identified one or more actions comprising reducing power consumption of a hard drive.

16. The system in accordance with claim 7, the power supply controller also being configured to identify that at least one of the first plurality of power supply units is flagged for closer monitoring.

17. The system in accordance with claim 16, wherein the at least one power supply unit is flagged based on serial number.

18. The method in accordance with claim 1, further comprising:

identifying at least one of the first power plurality of supply units as being flagged for closer monitoring.

19. The method in accordance with claim 18, wherein the at least one power supply unit is flagged based on serial number.

20. A computer program product comprising one or more hardware storage devices having stored thereon computer-executable instructions that are executable by one or more processors of a computer system to cause the computer system to perform at least the following:

detect a plurality of power supply unit sets of a shared power supply system that each include a single power feed and a single output, including at least a first power supply unit set that is supplied by a first power feed and supplies a single output corresponding to the first power supply unit set, the first power supply unit set comprising a first plurality of power supply units giving the single output corresponding to the first power supply unit set a first capacity, and a second power supply unit set that is supplied by a second power feed and supplies a single output corresponding to the second power supply unit set, the second power supply unit set comprising a second plurality of power supply units giving the single output corresponding to the second power supply unit set a second capacity, each of the first capacity associated with the first power supply unit set and the second capacity associated with the second power supply unit set being sufficient to solely provide all of the power that a server set consumes or is anticipated to consume;

determine that a change in the first capacity has occurred with respect to the single output corresponding to the first power supply unit set, including determining that a loss of functionality of at least one of the first plurality of power supply units has occurred, such that the single output corresponding to the first power supply unit set now has a new third capacity that is lower than the second capacity of the single output corresponding to the second power supply unit set and which is no longer capable of solely providing all of the power that the server set consumes or is anticipated to consume;

based at least on detecting that the change in the first capacity has occurred with respect to the single output corresponding to the first power supply unit set, identify one or more actions to perform on the server set that would lower power consumption of the server set to within the new third capacity of the single output corresponding to the first power supply unit set so that the new third capacity of the single output corresponding to the first power supply unit set would be able to solely provide all of the power that the server set consumes or is anticipated to consume if all of the plurality of power supply unit sets except the first power supply unit set were to be lost, such that redundancy in the shared power supply system is retained; and initiate the identified one or more actions to lower power consumption of the server set.

* * * * *